United States Patent [19]

Mosca et al.

[11] Patent Number: 5,837,965
[45] Date of Patent: Nov. 17, 1998

[54] FOCUSING HEAD OF A LASER BEAM PROVIDED WITH A FOCUSING LENS FOR A MACHINE FOR WORKING METAL AND NON-METAL PARTS

[75] Inventors: Claudio Mosca, Tenna; Stefano Perini, Trento, both of Italy

[73] Assignee: Salvagnini Italia S.p.A., Sarego, Italy

[21] Appl. No.: 766,590

[22] Filed: Dec. 12, 1996

[30] Foreign Application Priority Data

Dec. 14, 1995 [IT] Italy .......................... M195 A 002621

[51] Int. Cl.⁶ ................................. B23K 26/00
[52] U.S. Cl. .................... 219/121.75; 219/121.6
[58] Field of Search ........................ 219/121.6, 121.63, 219/121.67, 121.73, 121.75; 359/827

[56] References Cited

U.S. PATENT DOCUMENTS

| | | | |
|---|---|---|---|
| 4,135,778 | 1/1979 | Lincoln | 359/827 |
| 4,896,944 | 1/1990 | Irwin et al. | 219/121.75 X |
| 4,979,180 | 12/1990 | Muncheryan. | |
| 5,508,490 | 4/1996 | Klose | 219/121.6 X |
| 5,702,622 | 12/1997 | Schubert et al. | 219/121.75 |

FOREIGN PATENT DOCUMENTS

| | | | |
|---|---|---|---|
| A-2532215 | 8/1983 | France. | |
| 3814985 | 12/1988 | Germany | 219/121.75 |
| 62-199282 | 9/1987 | Japan | 219/121.75 |
| 2-217188 | 8/1990 | Japan | 219/121.75 |

OTHER PUBLICATIONS

Patent Abstracts of Japan, vol. 8, No. 116(M–299) [1553], 30 May 1984 & JP –A–59 024595 (Matsushita Denki Sangyo), 8 Feb. 1984.

Primary Examiner—Gregory L. Mills
Attorney, Agent, or Firm—Nixon & Vanderhye

[57] ABSTRACT

A focusing head of a laser beam provided with a focusing lens for a machine for working parts comprises an extractable lens-holding frame that supports the focusing lens, a supporting and centering bracket wherein the lens-holding frame is mounted in a disengageable manner, a spring in engagement with the supporting and centering bracket to urge the lens-holding frame in abutment against a stop socket. In that way the lens-holding frame is disengageable from the supporting and centering bracket by an action of compression of the spring and it can be extracted and reassembled in the focusing head without modifying centering and positioning of the focal spot of the lens.

9 Claims, 5 Drawing Sheets

FOCUSING HEAD OF A LASER BEAM PROVIDED WITH A FOCUSING LENS FOR A MACHINE FOR WORKING METAL AND NON-METAL PARTS

BACKGROUND OF THE INVENTION

This application is based on application No. MI95 A 002621 filed in Italy, the content of which is incorporated hereinto by reference.

The present invention relates to a focusing head of a laser beam provided with a focusing lens for a machine for working metal parts, preferably metal sheets, and non-metal parts.

Machines are known that use a laser beam for working metal parts, such as metal sheets, or non-metal parts. Typical workings are cutting, welding and the like. The laser beam is generated by a source of laser radiations and directed toward a focusing head along an optical path comprising elements for directing the beam formed by mirrors and a focusing lens.

The reliability of a machine for laser workings depends to a large extent on the quality of the elements constituting the optical path. In particular, the focusing lens is the optical element that is closest to the working area, consequently it is more exposed to contamination, damage and deposition of dust or micro fragments. A correct operation of a laser working machine thus involves the need to perform frequent inspections and cleaning operations of the elements forming the optical path, in particular the focusing lens.

Inspection and cleaning the lens involves the removal of the lens itself from the focusing head and thus the need, once the lens has been put back in the operating position, to check and adjust the centering of the optics with respect to the axis of the focusing head and the position of the focal spot on a working plane. In fact, an incorrect centering or an erroneous positioning of the focal spot of the laser beam can have a substantial influence on the quality of the working. Operations of checking centering and positioning of the focal spot require, as a rule, a considerable time during which the machine cannot be productive.

DISCLOSURE OF A PREFERRED EMBODIMENT

The object of the present invention is a focusing head of a laser beam that allows a focusing lens to be removed and reassembled easily and quickly, without requiring operations of checking and adjusting centering and positioning of the focal spot on a working plane.

The abovementioned object, according to the invention, is achieved with a focusing head of a laser beam provided with a focusing lens for a machine for working metal and non-metal parts, characterized in that it comprises an extractable lens-holding frame that supports said focusing lens, supporting and centering means wherein said lens-holding frame is mounted in a disengageable manner, elastic means in engagement with said supporting and centering means to urge said lens-holding frame in abutment against stopping means, said lens-holding frame being disengageable from said supporting and centering means by an action of compression of said elastic means so that it can be extracted and reassembled in said focusing head without modifying centering and positioning of the focal spot of said lens.

The focusing head according to the invention allows the lens-holding frame to be removed with simple and quick operations. Once the lens-holding frame has been removed, the lens is immediately accessible and can be inspected on both sides without extracting it from the frame. When the lens-holding frame is once again positioned in the focusing head, the lens returns to the initial operating position and there is no need to perform any other operation of checking or adjusting centering and positioning of the focal spot of the laser beam on the working plane. A self-centering repositioning is thus achieved.

An operation of inspection can therefore be performed in just a few seconds and, as a consequence, it can be repeated frequently without penalizing the productivity of the laser working machine. In this way the possibility is ensured of working with a focusing lens that is always in the best condition.

In a likewise quick manner the lens can be replaced with another, whenever necessary.

BRIEF DESCRIPTION OF THE DRAWING FIGURES

Features and advantages of the invention will now be illustrated with reference to an embodiment represented as a non-limiting example in the enclosed figures, wherein.

DETAILED DESCRIPTION OF A PREFERRED EMBODIMENT

Figure 1:
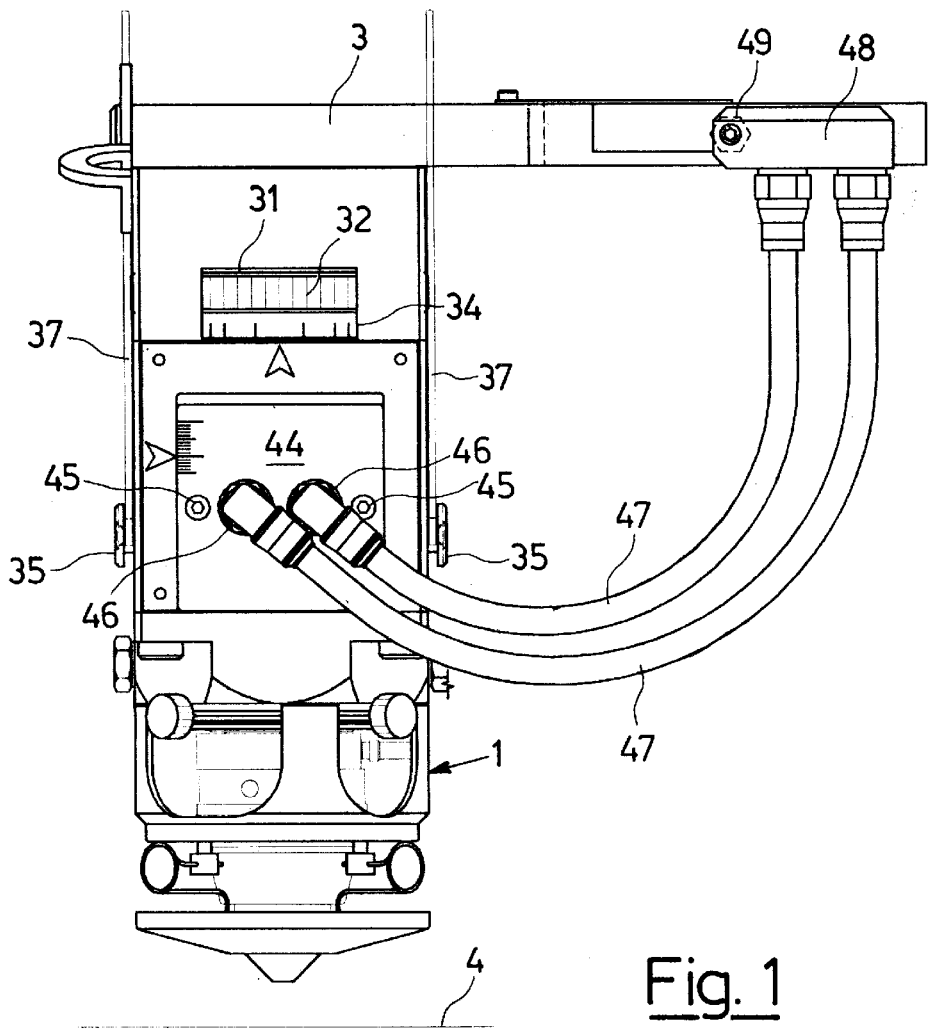
FIG. 1 is a front view of a focusing head of a laser beam made according to the invention.
Figure 2:
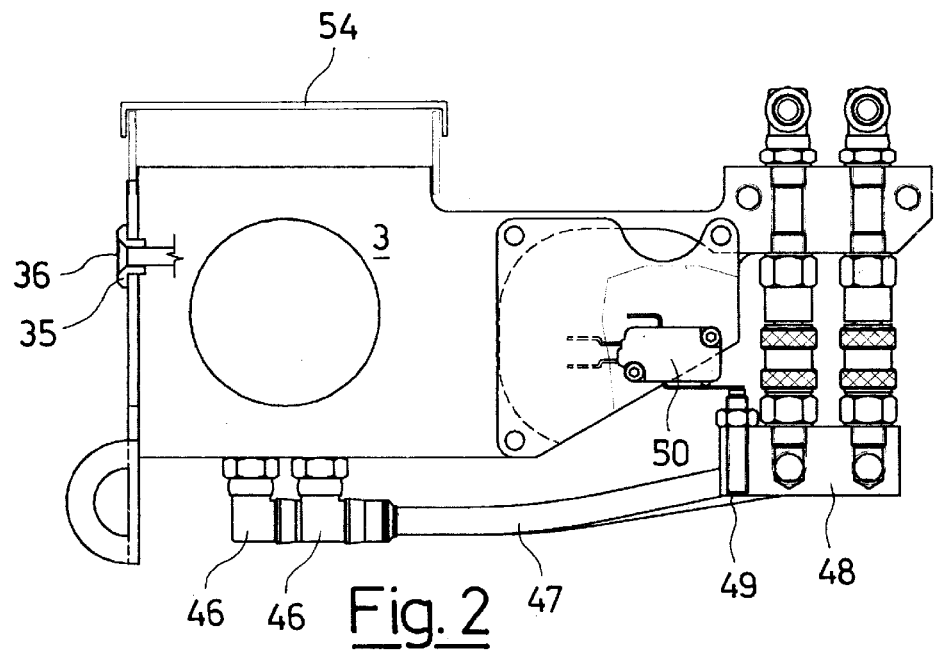
FIG. 2 is a view from above of the head of FIG. 1.

There is shown in FIGS. 1–4 a focusing head 1 of a laser beam 2, made according to the invention. The head 1 is mounted on a girder 3 in a machine for working parts, particularly metal sheets, such as a machine for shearing, welding and such like, not shown. The head 1 focuses the laser beam 2 on a metal sheet, not shown, placed on a working plane 4.

The head 1 is provided with a cylindrical sleeve 5 inside which there is mounted an extractable lens-holding frame, or box, 6, containing a lens 7, as shown in FIGS. 3, 5, 6 and 7. The lens-holding frame 6 is formed by a plate 8 provided with a half-cylinder-shaped end 9 at which an annular seat 10 for a bush 11 is obtained. The bush 11 is inserted with interference in the seat 10 with the interposition of gaskets 12. The bush 11 is provided with an annular groove 51 that, with the seat 10, forms an annular chamber 18 in communication with conduits 19 from which coolant capable of avoiding overheating of the lens 7 is supplied.

The bush 11 is provided with an annular ridge 13 wherein a seat 14 for the lens 7 is obtained. The lens 7 is mounted in the seat 14 with the interposition of gaskets 15 and is clamped in position by a threaded ring nut 16 screwed into the bush 11.

Figure 3:
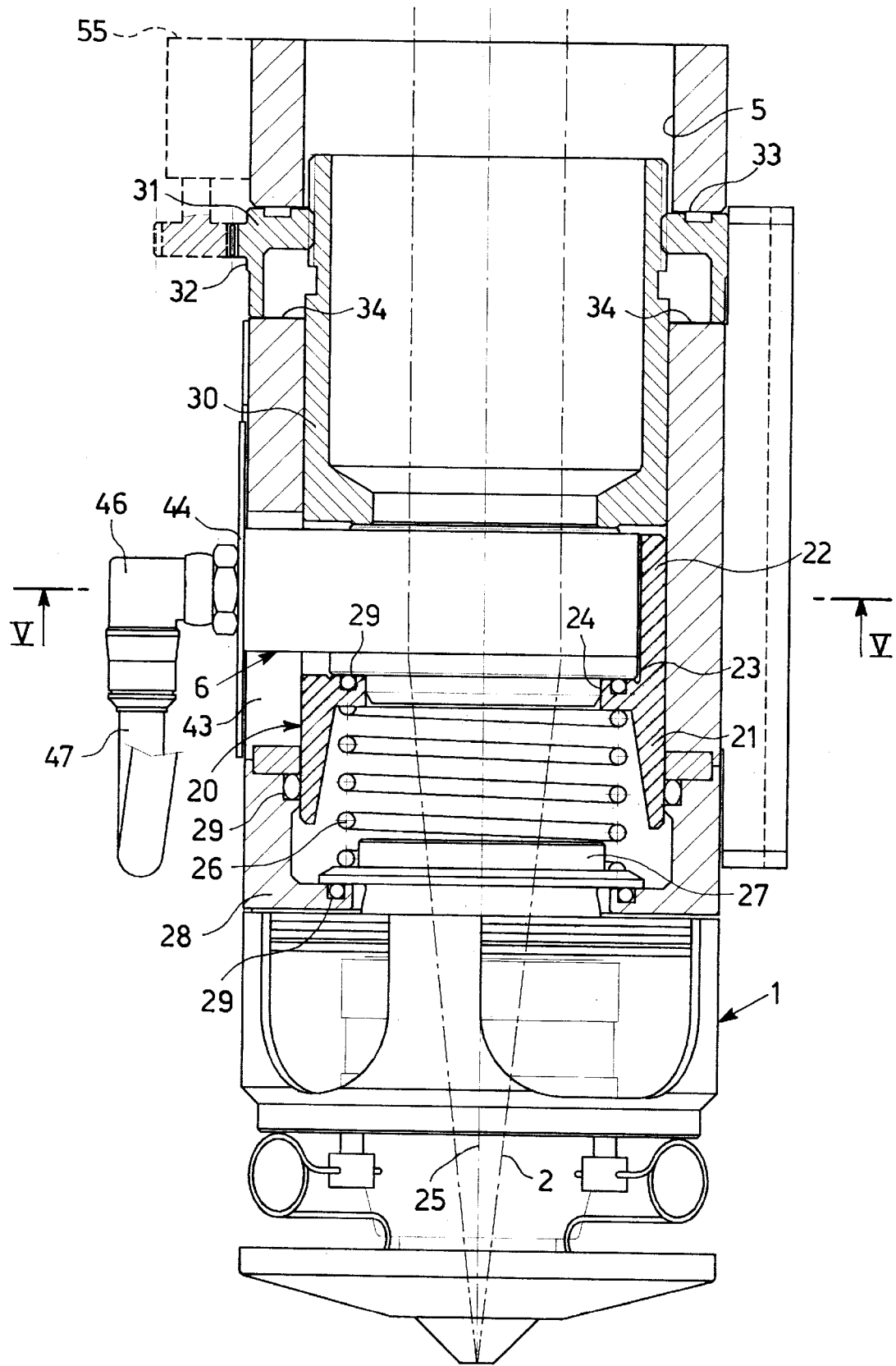
FIG. 3 is a right side view, partially in an axial cross-section, on an enlarged scale, of the focusing head of FIG. 1.
Figure 5:
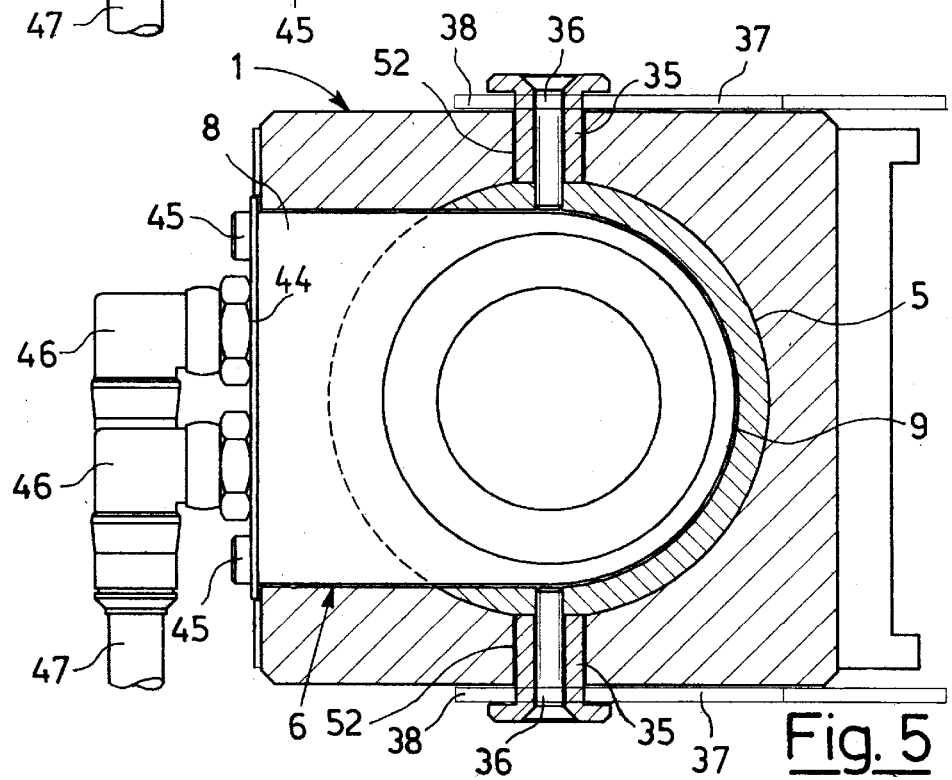
FIG. 5 is a cross-sectional view taken along the plane V—V of FIG. 3.

In the sleeve 5 there is mounted a supporting and centering bracket, or shutter, 20 wherein the lens-holding frame 6 is housed. The supporting and centering bracket 20 is formed by a sleeve 21 provided with a half-cylinder-shaped wall 22 and forms a seat 23 wherein there is housed the half-cylinder-shaped end 9 of the lens-holding frame 6 (FIGS. 3 and 5). The sleeve 21 forms an annular seat 24 into which there penetrates the annular ridge 13 of the bush 11. In that way the frame 6 and the lens 7 are centered with respect to the supporting and centering bracket 20 and the focal axis of the lens 7 coincides with a vertical axis 25 of the head 1.

A spring 26 is interposed between the sleeve 21 of the supporting and centering bracket 20 and an annular washer 27 mounted in a lower bowl 28 of the head 1. Sealing gaskets 29 are interposed between the lens-holding frame 6 and the sleeve 21, between the latter and the bowl 28 and between this and the washer 27. The spring 26 exerts a thrust on the lens-holding frame 6, through the supporting and centering bracket 20, that keeps it in abutment against a stop socket 30.

The stop socket 30 is positioned in the sleeve 5 through a threaded ring nut 31 provided with a knurled crown 32. The ring nut 31 is mounted in slots 34 of the head 1 with the interposition of gaskets 33 in an anti-friction material. The ring nut 31 is accessible from the outside and is made to rotate by an operator through the knurled crown 32 for adjusting the axial position of the stop socket 30 inside the sleeve 5. This allows the adjustment of the axial position of the lens 7 and of its focal distance from the working plane 4.

Figure 4:
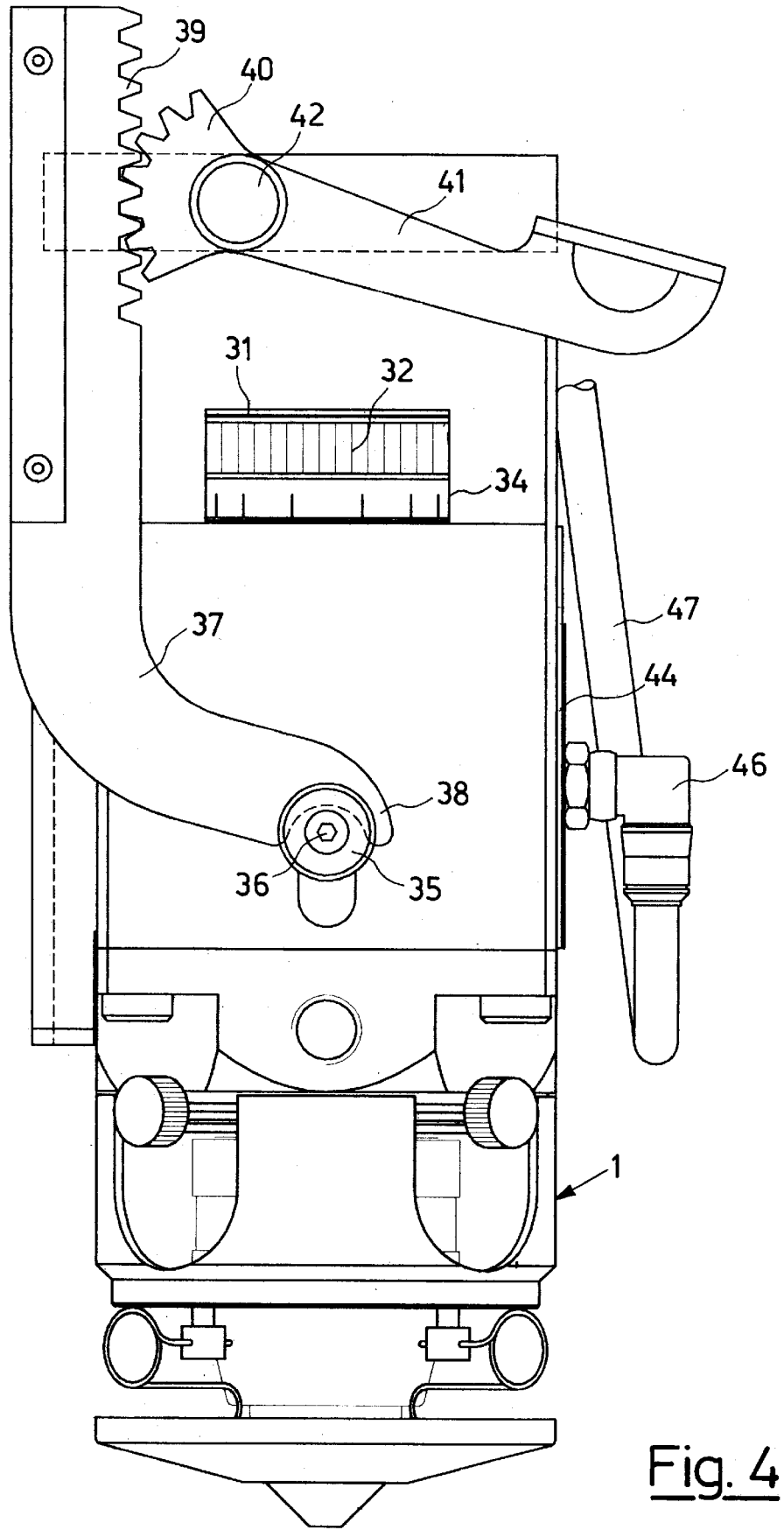
FIG. 4 is a left side view, on an enlarged scale, of the focusing head of FIG. 1.
Figure 6:
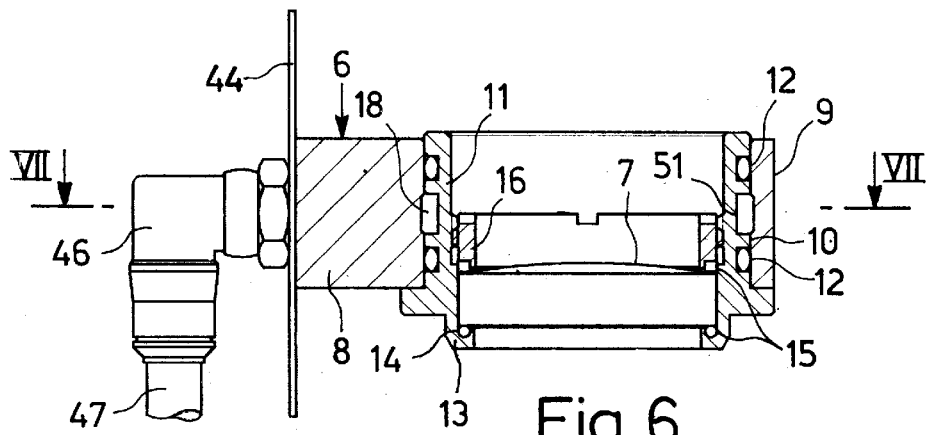
FIG. 6 is an axial cross-sectional view of a lens-holding frame of the focusing head of FIG. 1.
Figure 7:
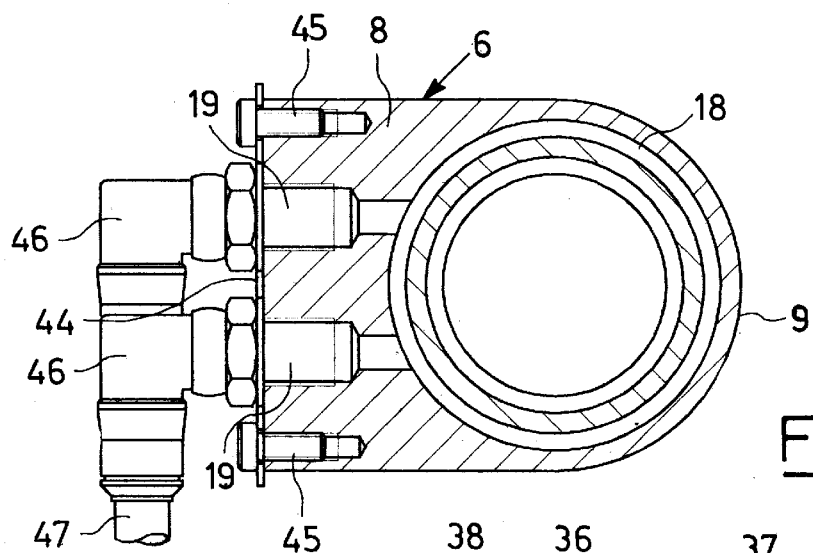
FIG. 7 is a cross-sectional view taken along the plane VII—VII of FIG. 6.

The sleeve 21 of the bracket 20 is provided with two mushroom-shaped bushes 35 inserted in two diametrically-opposite holes 52 and fastened by means of screws 36 (FIGS. 1, 4 and 5). With the bushes 35 there engage two forks 38 of two sliding rods 37. The rods 37 are supported by the girder 3 by means of two vertical slides, not shown, and are connected by a crosspiece 54. One rod 37 is provided with a rack 39 that meshes with a toothed sector 40 of a lever 41 that can be operated by hand, hinged at 42 to the head 1 (FIG. 4).

By rotating the lever 41 anti-clockwise, the rods 37, through the bushes 35, urge the supporting and centering bracket 20 downward against the action of the spring 26, separating and spacing the lens-holding frame 6 from the stop socket 30. In that way the lens-holding frame 6 can be extracted from the seat 24 of the bracket 20 and removed through an aperture 43 (FIG. 3) of the head 1 for operations of overhaul, cleaning, or possible replacement, of the lens 7.

The aperture 43 is closed by a cover 44 fastened to the plate 8 of the lens-holding frame 6 by means of screws 45. The cover 44 is provided with fittings 46 connected to flexible pipes 47 that convey the coolant to the conduits 19. The pipes 47 are connected to a quickcoupling connector 48 mounted in the girder 3, supplied from a source of coolant, not shown. The connector 48 is provided with a pin 49 capable of operating a microswitch 50. In that way an electrical signal is generated that warns the operator of the presence in the frame 6 of a lens 7 suitable for using an assistance gas at high pressure, above 0.8 MPa. The assistance gas varies according to the material of the metal sheet to be worked, for example oxygen is preferred for mild steel and nitrogen for stainless steel.

Figure 8:
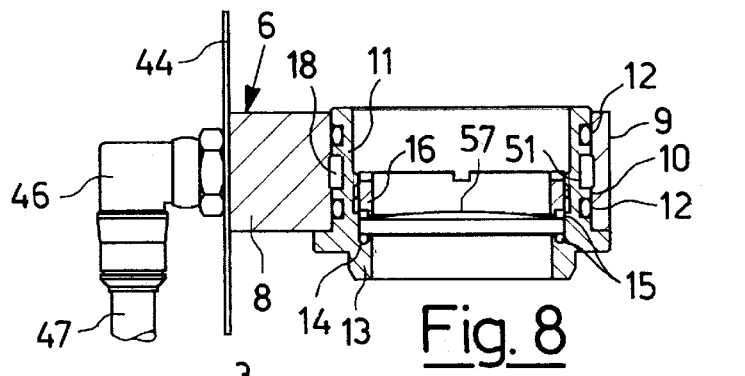
FIG. 8 shows a variant of the lens-holding frame of FIG. 6.
Figure 9:
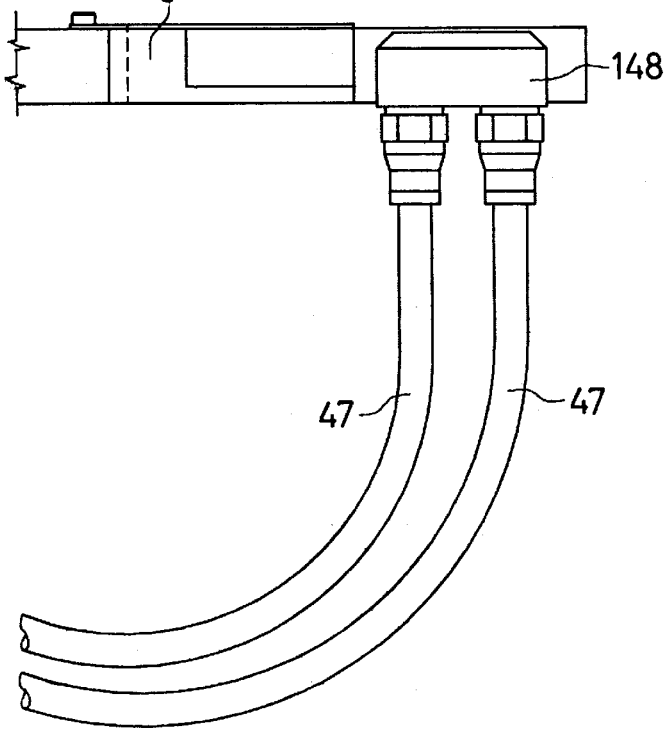
FIGS. 9 and 10 are partial views, from the front and from above, of a variant of a cooling circuit of the focusing head of FIG. 1.
Figure 10:
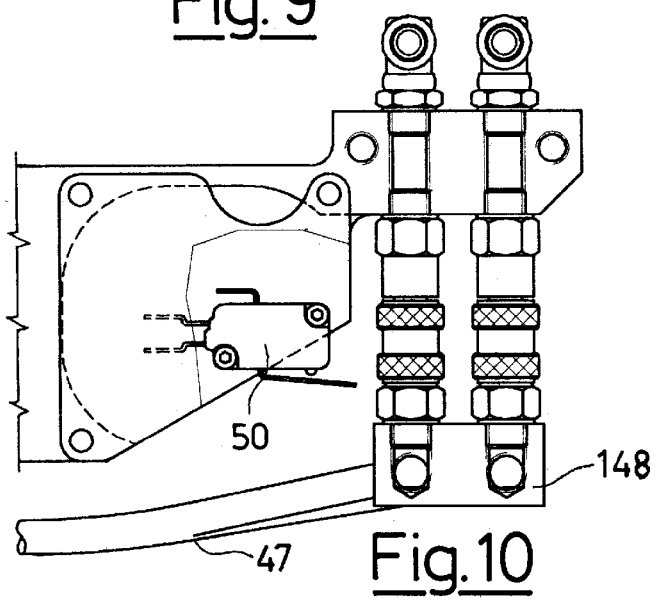

The head 1 can also use an assistance gas at low pressure, not higher than 0.8 MPa. In this case a focusing lens 57 (FIG. 8) is mounted in the frame 6 and the flexible pipes 47 are connected to a connector 148 (FIGS. 9 and 10) that is not in a position to operate the microswitch 50. Thus, the lack of the electrical signal of the microswitch 50 indicates to the operator the presence in the head 1 of a lens 57 suitable for an assistance gas at low pressure.

In a variant of the invention the stop socket 30 can be operated automatically, instead of by hand. In this case, an actuator, such as an electric motor, represented diagrammatically by a dashed block 55, operates the ring nut 31. The actuator 55 is driven by an electronic control unit of the working machine, not shown. The operator inserts into the control unit the focal error of the lens 7 or 57, determined with an appropriate test cycle when the optics are first installed in the machine, and, by means of an appropriate control program, he performs the automatic correction of the position of the focal point. The motor driving the operations for the adjustment of the position of the focal point also allows the automatic adjustment of the focusing to be performed in relation to the characteristics of the working, or adaptative it in relation to the nature of the material and of the position of the focusing head with respect to the working plane.

We claim:

1. A laser beam focusing head for use in a machine for working metal and non-metal parts, the head having a focusing lens, comprising an extractable lens-holding frame for supporting the focusing lens, supporting and centering means mounting said lens-holding frame for disengagement therefrom, elastic means in engagement with said supporting and centering means for urging said lens-holding frame into abutment against a stopping means, said lens-holding frame being disengageable from said supporting and centering means by compression of said elastic means enabling the lens-holding frame and focusing lens carried thereby to be extracted from and reassembled in the focusing head without modifying centering and positioning of a focal point of said lens.

2. A focusing head according to claim 1 wherein said lens-holding frame is formed by a plate having an annular seat for a bush, said bush having an annular ridge providing a seat for the lens, and a threaded ring nut screwed into said bush for clamping the lens in the bush.

3. A focusing head according to claim 2 wherein said bush is provided with an annular groove forming with said annular seat an annular chamber in communication with conduits in said plate through which coolant for cooling the lens is supplied.

4. A focusing head according to claim 2 wherein said supporting and centering means comprises a supporting and centering bracket formed by a sleeve having a half-cylinder-shaped wall forming a seat for housing said lens-holding frame, an annular seat for receiving said annular ridge of said bush so that said frame and the lens carried thereby are centered with respect to said supporting and centering means and a focal axis of said lens coincides with a vertical axis of said head.

5. A focusing head according to claim 4 wherein said elastic means comprises a spring interposed between said sleeve of said supporting and centering bracket and the focusing head, said spring exerting a thrust on said lens-holding frame, through said supporting and centering bracket, to maintain said lens-holding frame in abutment against said stopping means.

6. A focusing head according to claim 4 wherein said sleeve of said supporting and centering bracket has two diametrically-opposite mushroom-shaped bushes engaged with two forks of two sliding rods connected by a crosspiece, one of said rods being provided with a rack for meshing with a toothed sector of a manually operable lever whereby rotation of said rods by operation of said lever urges said supporting and centering bracket downward against the bias of said elastic means, separating and spacing said lens-holding frame from said stop socket so that said lens-holding frame can be extracted from said seat of said bracket and removed through an aperture of said focusing head.

7. A focusing head according to claim 6 wherein a cover is fastened to said plate of said lens-holding frame for closing said aperture, said cover being provided with fittings connected to flexible pipes, a quick-coupling connector connected to said flexible pipes, said connector having a pin capable of operating a microswitch and being further connected to a source of coolant.

8. A focusing head according to claim 1 wherein said stopping means includes a stop socket positioned inside said focusing head, a threaded ring nut having a knurled crown carried by the focusing head, said ring nut being mounted in slots of said focusing head and accessible externally of said head, said ring nut being rotatable to adjust an axial position of said stop socket, an axial position of the lens and a focal distance of the lens from a working plane.

9. A focusing head according to claim 8 wherein said ring nut is operatively connected to a motorized actuator for automatically adjusting a position of the focal point of the lens in relation to a detected focal error.

\* \* \* \* \*